US012692724B2

(12) United States Patent
Underwood et al.

(10) Patent No.: US 12,692,724 B2
(45) Date of Patent: Jul. 28, 2026

(54) VEHICLE LATCH ASSEMBLY FOR SLINDING DOOR

(71) Applicant: Kason Industries, Inc., Newnan, GA (US)

(72) Inventors: Jeffrey E. Underwood, Newnan, GA (US); Brett A. Mitchell, Newnan, GA (US)

(73) Assignee: Kason Industries, Inc., Newnan, GA (US)

( * ) Notice: Subject to any disclaimer, the term of this patent is extended or adjusted under 35 U.S.C. 154(b) by 46 days.

(21) Appl. No.: 18/200,184

(22) Filed: May 22, 2023

(65) Prior Publication Data

US 2023/0374823 A1 Nov. 23, 2023

Related U.S. Application Data

(60) Provisional application No. 63/344,747, filed on May 23, 2022.

(51) Int. Cl.

*E05B 65/08* (2006.01)
*E05B 3/00* (2006.01)
*E05B 53/00* (2006.01)
*E05B 83/04* (2014.01)

(52) U.S. Cl.

CPC .............. *E05B 65/08* (2013.01); *E05B 3/003* (2013.01); *E05B 53/00* (2013.01); *E05B 83/04* (2013.01)

(58) Field of Classification Search

CPC .......... E05B 53/00; E05B 79/22; E05B 85/12; E05B 65/08; E05B 65/0811; E05B 65/0858; E05B 83/04; E05B 83/06; E05B 83/40; E05B 83/42; E05B 3/003; E05B 77/17; E05B 9/002; E05B 9/02; E05B 79/04; E05B 79/06; E05C 3/10

See application file for complete search history.

(56) References Cited

U.S. PATENT DOCUMENTS 73,624 A 1/1868 Merrifield
797,425 A * 8/1905 Haag ........................ E05B 85/22 292/164
857,922 A 6/1907 Campbell
(Continued)

FOREIGN PATENT DOCUMENTS

CN 101929280 B * 6/2014
CN 114233106 B * 8/2024 ............. E05B 17/00
(Continued)

*Primary Examiner* — Kristina R Fulton
*Assistant Examiner* — Emily G. Brown
(74) *Attorney, Agent, or Firm* — Baker, Donelson, Bearman, Caldwell & Berkowitz, PC

(57) ABSTRACT

A latch assembly includes a latch, a latch bar, an inside handle, an outside handle, and a handle shaft. The housing is coupled to a rear support bracket. A U-shaped brace is mounted to the support bracket. The inside handle is coupled to the brace for reciprocal, pivotal movement and operation of the latch assembly. The inside handle is coupled to a first link which is coupled to an offset link. The first link is mounted to the shaft of the latch assembly through a mounting barrel or fitting having a shaft hole that is configured to receive and hold the exposed end of the shaft. The movement of the handle moves the first link which pivots the second link so as to rotate the handle shaft.

4 Claims, 9 Drawing Sheets

(56) References Cited

U.S. PATENT DOCUMENTS

| | | | | | |
|---|---|---|---|---|---|
| 880,621 | A | | 3/1908 | Bowers | |
| 953,905 | A | | 4/1910 | Fry | |
| 1,945,257 | A | | 1/1934 | Cook | |
| 2,118,729 | A | | 5/1938 | Hogan | |
| 2,187,531 | A | | 1/1940 | Butler | |
| 2,439,549 | A | | 4/1948 | Quigley et al. | |
| 2,530,330 | A | | 11/1950 | Groeger | |
| 2,540,686 | A | | 2/1951 | Milburn | |
| 2,677,262 | A | | 5/1954 | Vigmostad | |
| 2,793,894 | A | | 5/1957 | Modes | |
| 2,862,750 | A | * | 12/1958 | Minke | E05B 53/00 292/336.3 |
| 2,928,690 | A | * | 3/1960 | Larson | E05B 53/00 292/336.3 |
| 3,025,693 | A | | 3/1962 | Braginetz | |
| 3,094,352 | A | * | 6/1963 | May | E05B 83/36 292/336.3 |
| 3,198,564 | A | | 8/1965 | Welsh | |
| 3,572,790 | A | | 3/1971 | Kapanka | |
| 3,630,557 | A | | 12/1971 | Pierce | |
| 3,670,536 | A | * | 6/1972 | Klebba | E05B 65/0811 70/487 |
| 3,904,229 | A | | 9/1975 | Waldo | |
| 4,126,340 | A | | 11/1978 | Pelcin | |
| 4,457,146 | A | | 7/1984 | Weinerman | |
| 4,511,166 | A | * | 4/1985 | Weinerman | E05B 65/0811 292/29 |
| 4,687,236 | A | | 8/1987 | Rasche | |
| 4,763,934 | A | * | 8/1988 | Kaveney, Jr. | E05B 63/16 70/152 |
| 4,835,997 | A | * | 6/1989 | Akright | E05B 83/367 292/216 |
| 5,125,698 | A | | 6/1992 | Thau | |
| 5,141,266 | A | | 8/1992 | Braun et al. | |
| 5,171,048 | A | | 12/1992 | Weinerman et al. | |
| 5,221,115 | A | | 6/1993 | Takimoto | |
| 5,501,495 | A | | 3/1996 | Claucherty | |
| 5,520,423 | A | | 5/1996 | Finkelstein et al. | |
| 5,526,659 | A | | 6/1996 | Takimoto | |
| 5,540,066 | A | | 7/1996 | Takimoto | |
| 5,573,287 | A | | 11/1996 | Takimoto | |
| 5,979,949 | A | | 11/1999 | Finkelstein et al. | |
| 7,055,874 | B1 | * | 6/2006 | Jeffries | E05B 9/08 292/DIG. 64 |
| 8,931,813 | B2 | * | 1/2015 | Juga | E05B 13/004 292/216 |
| 2007/0126247 | A1 | | 6/2007 | Yoshimura | |
| 2020/0165847 | A1 | * | 5/2020 | Zhang | E05B 1/003 |
| 2023/0278404 | A1 | * | 9/2023 | Fisher | B60J 5/0497 296/190.11 |

FOREIGN PATENT DOCUMENTS

| | | | | | |
|---|---|---|---|---|---|
| DE | 10313711 | A1 | * | 10/2004 | E05B 1/0053 |
| EP | 2243905 | A1 | * | 10/2010 | E05B 1/0053 |
| FR | 2866667 | A1 | * | 8/2005 | E05B 53/003 |
| KR | 20090123320 | A | * | 12/2009 | E05B 83/42 |
| WO | WO-8302638 | A1 | * | 8/1983 | |

* cited by examiner

VEHICLE LATCH ASSEMBLY FOR SLINDING DOOR

CROSS REFERENCE TO RELATED APPLICATIONS

This application claims the benefit of U.S. Provisional Patent Application No. 63/344,747 filed May 23, 2022 and entitled "Vehicle Latch Assembly For Sliding Door", and is incorporated herein by reference.

TECHNICAL FIELD

This invention relates to vehicle door latches, and particularly to latch assemblies for a vehicle sliding doors.

BACKGROUND OF INVENTION

Package delivery trucks, which have also been referred to as panel trucks and vans, typically have one or more sliding doors. By gripping a door handle on the inside or outside, the door may be manually moved between positions closing and opening a doorway in the truck body. These doors typically have a latch coupled with the two handles which holds the door in a fully opened or fully closed position by engagement with strikes mounted to the door opening adjacent each end of the door run. The door in its closed position may thus be unlatched and slid open from either side of the door by rotation and pulling of the inside or outside handle.

A common problem with these doors is the proper mounting of the latch to the door itself, as the height of the door may vary. If the latch is not properly mounted, the latch is difficult to open. Therefore, a need remains to be able to provide a proper height of the latch handle for operation on a particular vehicle.

Accordingly, it is seen that a need exists for a vehicle door latch which can vary in height according to the position upon the vehicle door. It is to the provision of such therefore that exemplary embodiments of the present invention are primarily directed.

SUMMARY OF THE INVENTION

A vehicle latch assembly for a sliding door comprises a latch having a latch housing, a movable latch bar with at least one end having a catch, and a rotatable handle shaft coupled to the latch housing for movement of the catch. The latch assembly also includes a first link having a shaft end coupled to an interior end of the handle shaft, the first link also having a link end distal the interior end, and a second link having a lower end pivotally coupled to the link end of the first link, the second link having an upper end distal said lower end. The vehicle latch also has an interior handle pivotally coupled to the latch housing, the interior handle also being pivotally coupled to the upper end of the second link. With this construction, the pivotal movement of the interior handle causes movement of the second link which in turn causes pivotal movement of the first link that causes rotation of the handle shaft that causes a lifting motion of the latch bar to unlatch the latch assembly.

DETAILED DESCRIPTION

Figure 1:
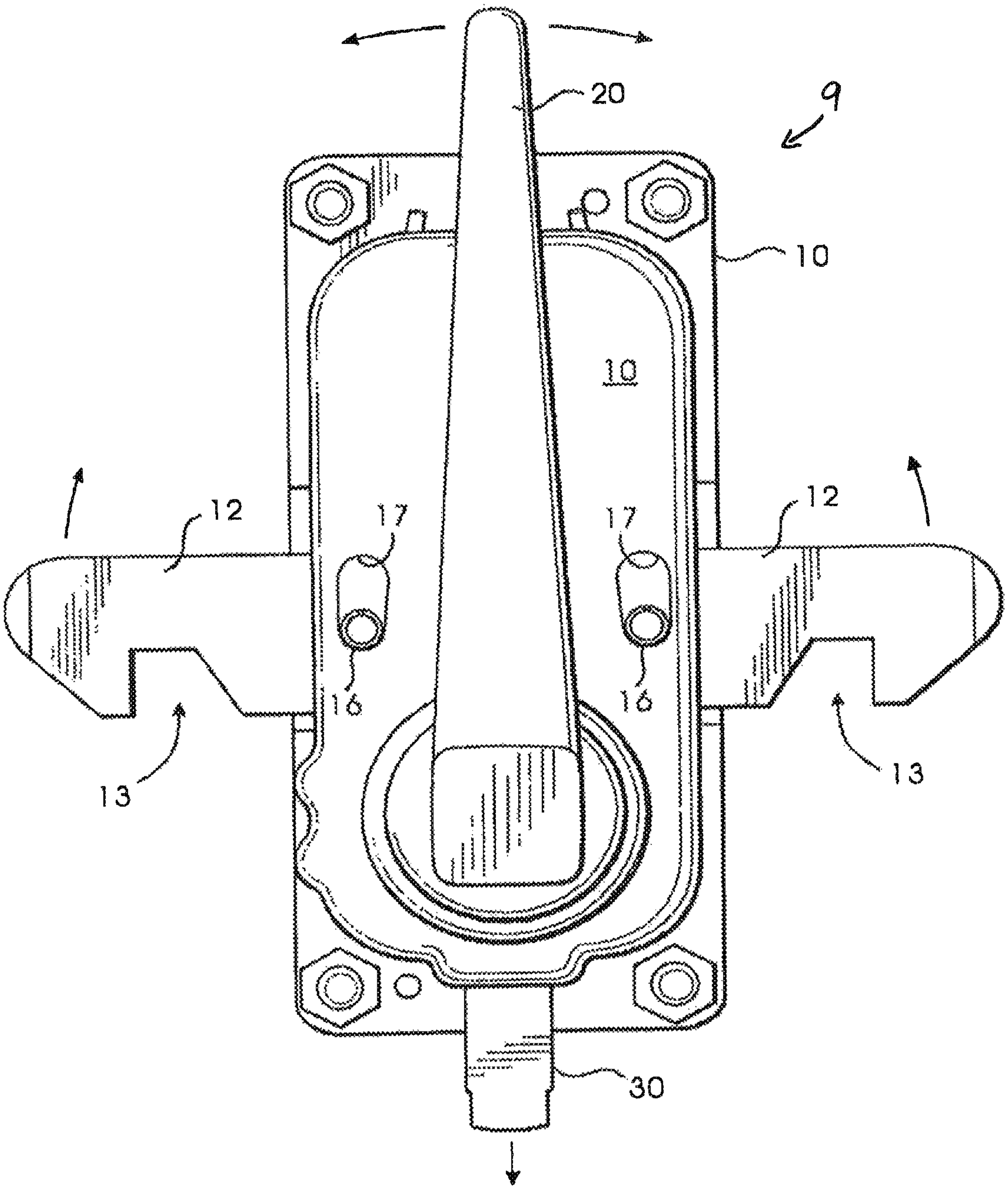
FIG. 1 PRIOR ART
FIG. 1 is an inside front view of a latch assembly of the prior art.
Figure 2:
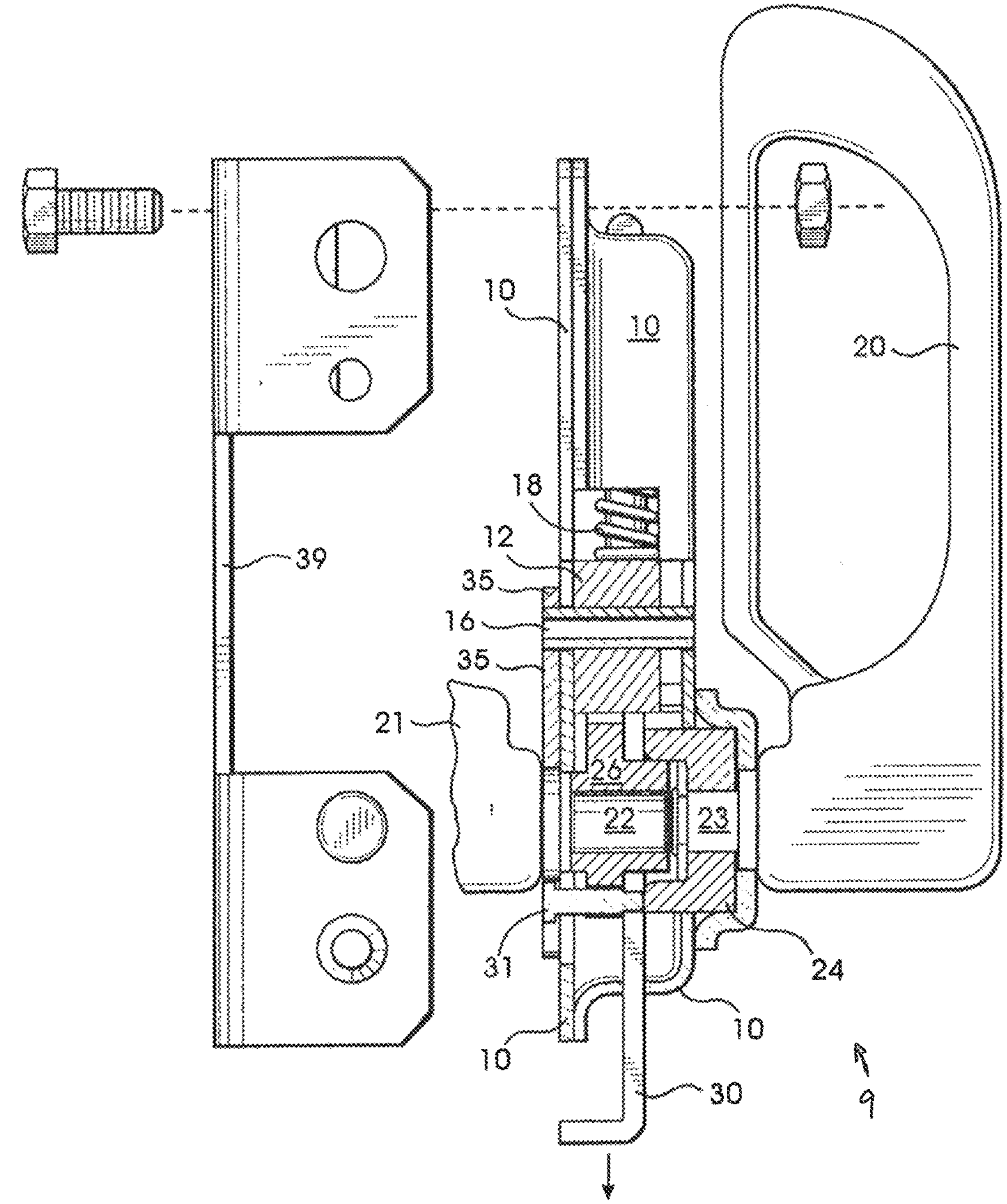
FIG. 2 PRIOR ART
FIG. 2 is a side view, partly in cross-section, of the latch assembly of FIG. 1.
Figure 3:
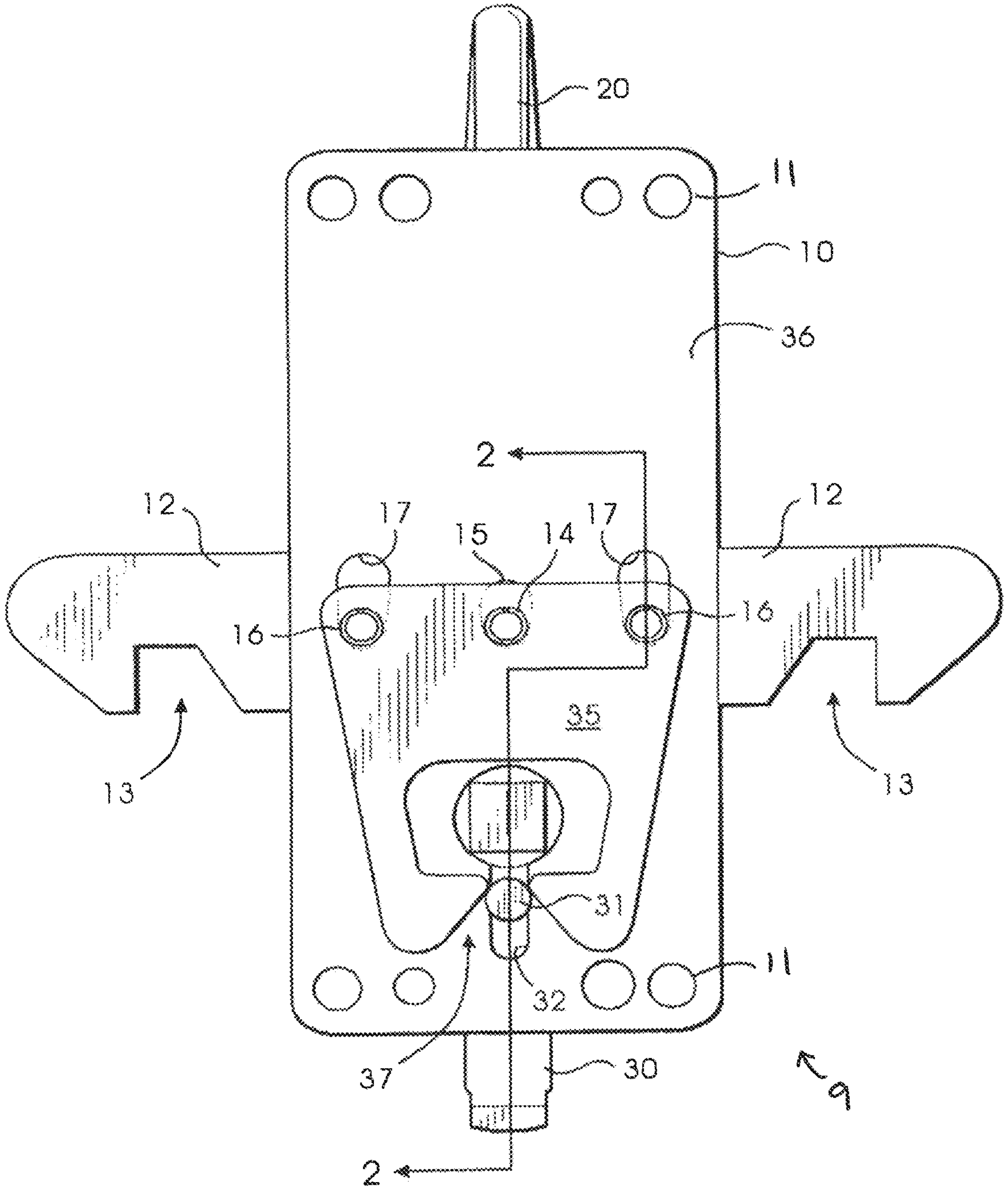
FIG. 3 PRIOR ART
FIG. 3 is a rear view of the latch assembly of FIG. 1.
Figure 4:
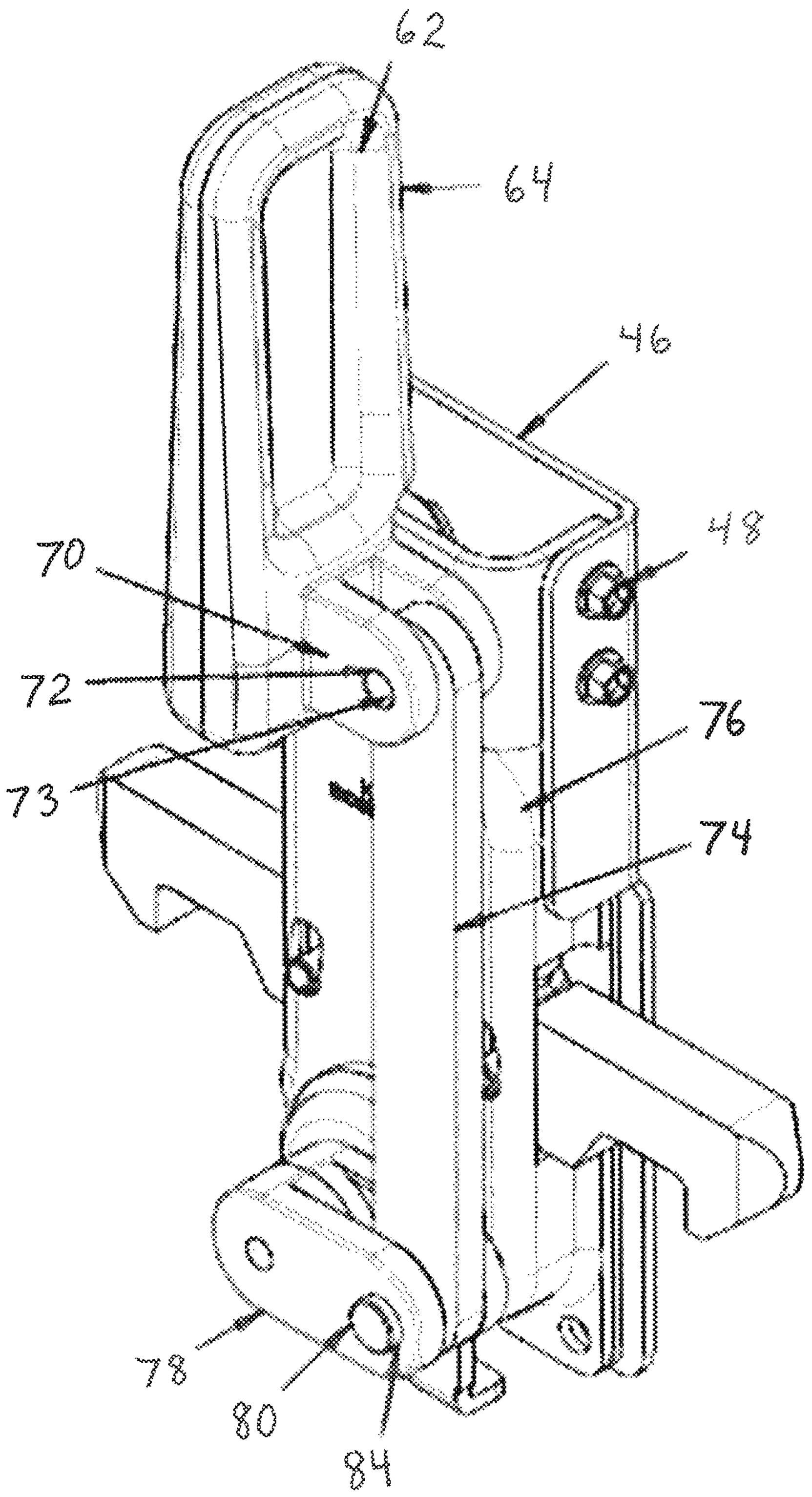
FIG. 4 is a front perspective view of a latch assembly in a preferred form of the invention.
Figure 5:
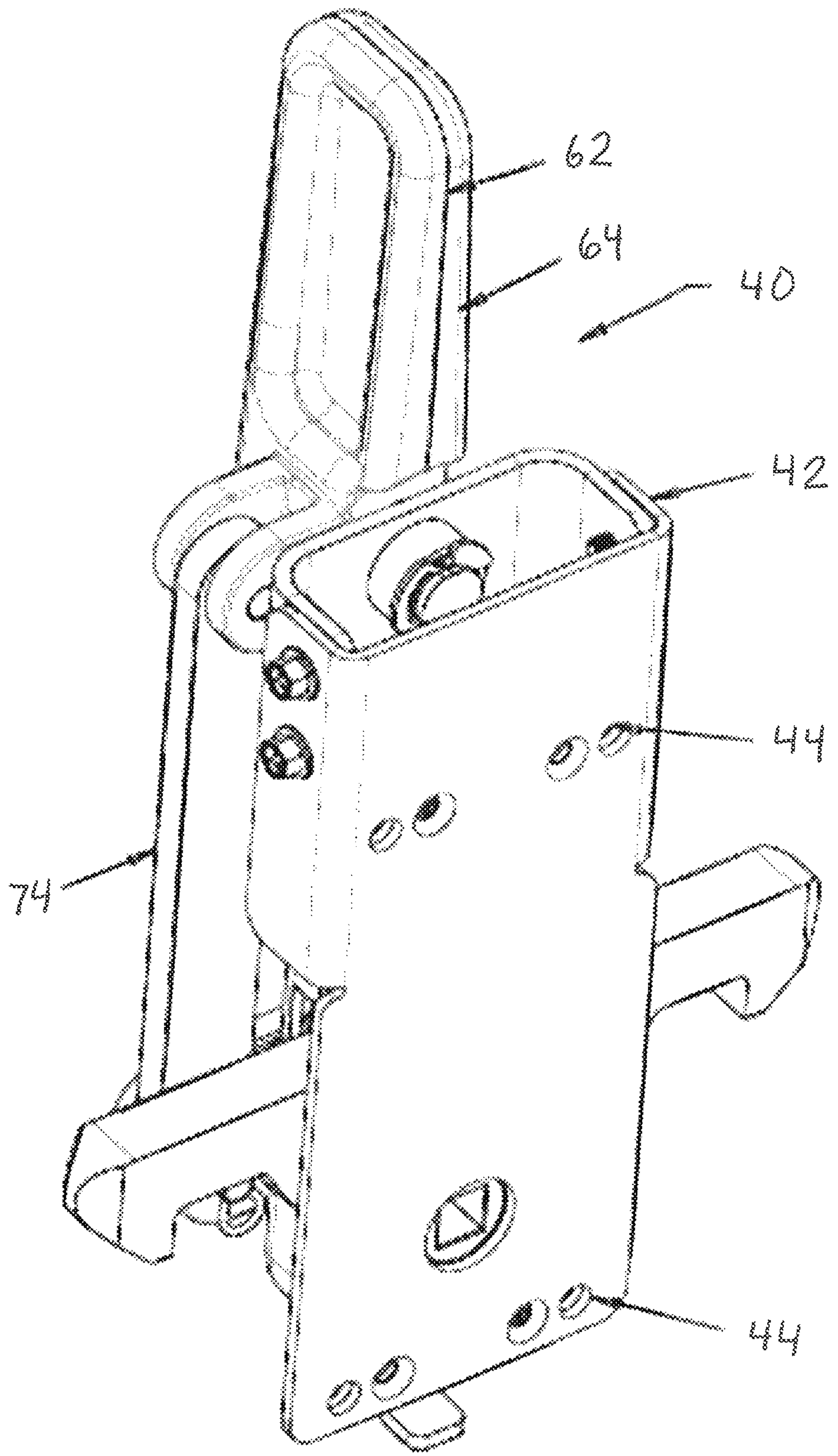
FIG. 5 is a rear perspective view of the latch assembly of FIG. 4.
Figure 6:
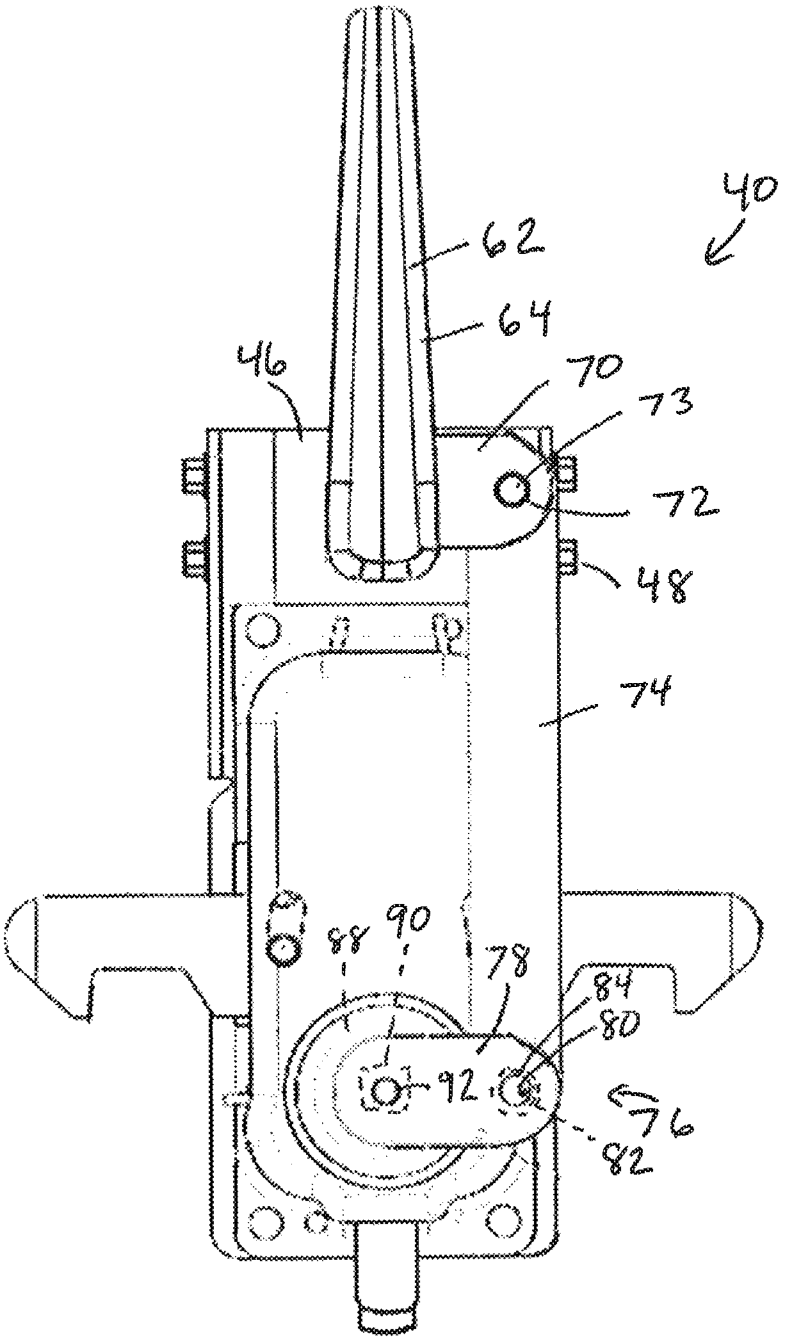
FIG. 6 is a front view of the latch assembly of FIG. 4.
Figure 7:
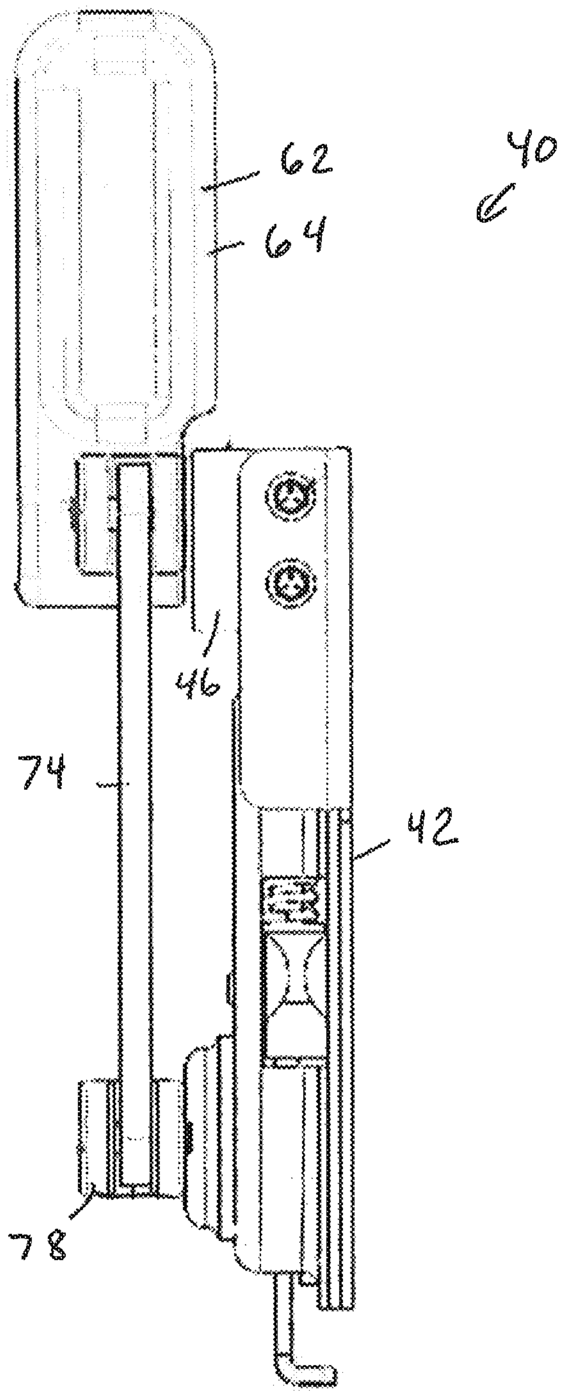
FIG. 7 is a right side view of the latch assembly of FIG. 4.
Figure 8:
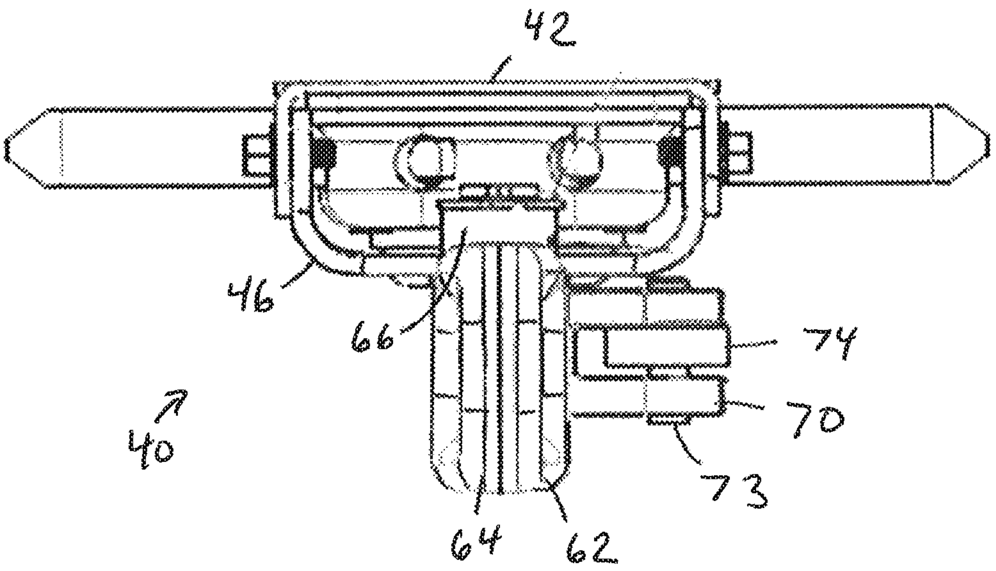
FIG. 8 is a top view of the latch assembly of FIG. 4.
Figure 9:
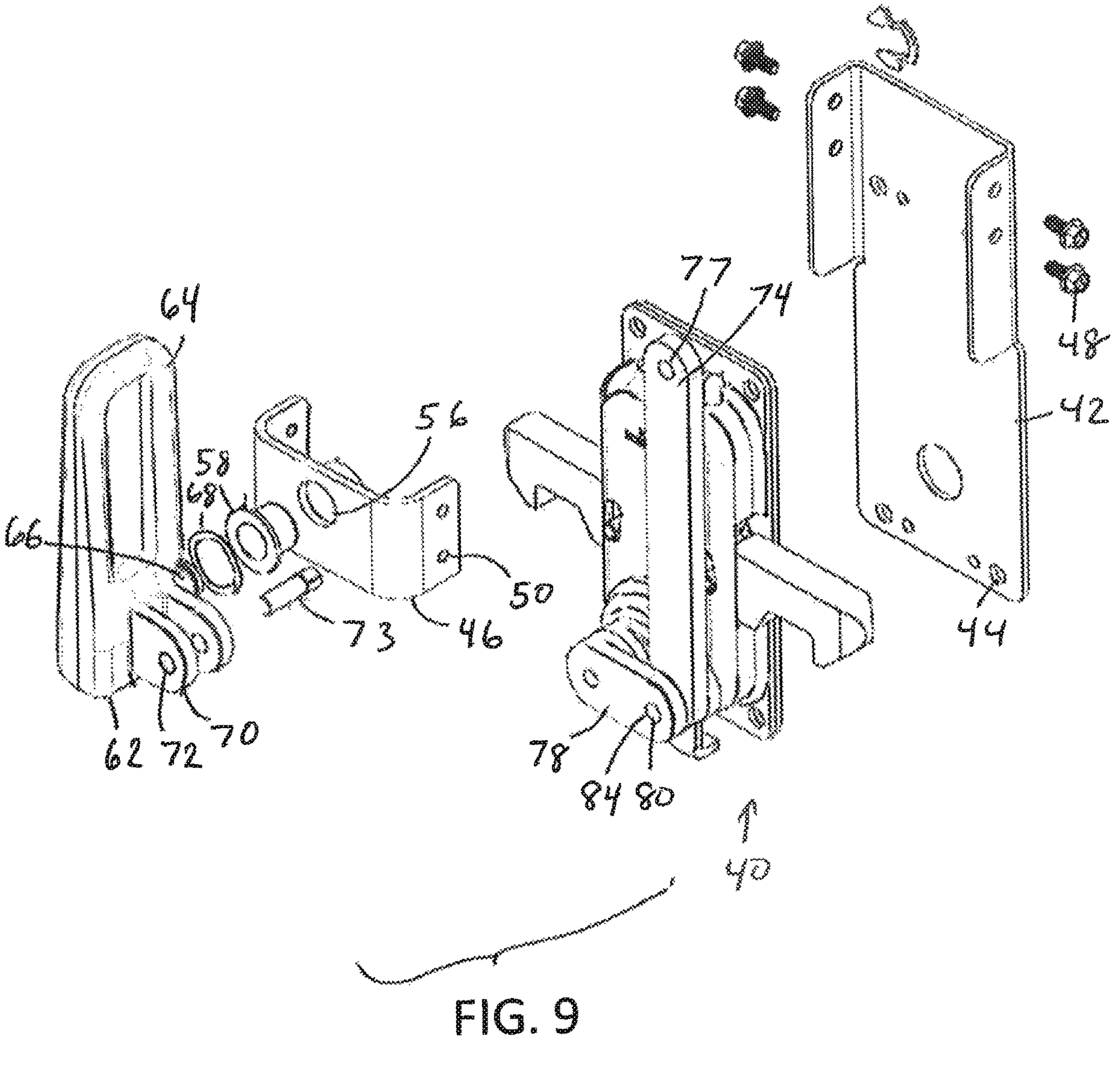
FIG. 9 is an exploded, perspective view of the latch assembly of FIG. 4.

With reference to the drawings, there is shown in FIGS. 1-3 a prior art latch assembly 9, which is described in detail in U.S. Pat. No. 5,979,949, which is specifically included herein by reference in its entirety. The latch 9 is for a sliding door and comprises a housing 10 to which a latch bar 12 is pivotably mounted. The latch bar is seen to extend laterally through and to each side of the housing and to be formed with two catches 13 adjacent its two opposite ends. The latch bar is movably mounted to the housing by a center pin 14 that extends through a housing slot 15 and by two roll pins 16 that extend through two other slots 17 that straddle slot 15. Since all of these pins are smaller than their slots, the latch bar has some limited freedom of movement with respect to the housing. Two compression springs 18 are mounted to opposite sides of the center pin 14 and bias the latch bar 12 downwardly bringing those pins into contact with the bottom of the slots 15 and 17. Thus, the latch bar may be lifted slightly as well as rotated about the center pin a little as its beveled ends engage a strike in causing either end to be cammed upwardly in seating one of its catches 13 on a strike. The strikes, unshown here, are mounted to both sides of the track on which a sliding door equipped with the latch is mounted to run.

The latch is equipped with both an interior or inside handle 20 and an outside handle 21 that is shown broken away in FIG. 2. Each of these handles are provided to lift the latch catch off of a strike in unlatching the door to which it is mounted. The inside handle 20 has a handle shaft 23 which is rigidly mounted to an inboard cam 24 that has a cylindrical portion journaled in a housing bearing. In FIG. 2 the cam is shown out of camming engagement with the bottom of the latch bar 12. However, clockwise or counterclockwise rotation of the handle 20 and the inboard cam 24 brings the cam into camming engagement with the latch bar to one side or the other of the center pin 14. This causes the latch bar to lift slightly and to cock or rotate against the biasing force exerted by the closer of the two compression springs 18. Similarly, manual operation of the largely unshown outside handle 21 and its shaft 22 causes an outboard cam 26 to which it is rigidly mounted to move into camming engagement with the latch bar independently of any operation of the inside handle 20.

The latch is provided with means for manually locking the latch from the inside of a sliding door to which it is mounted to prevent the door from being unlatched from the outside. This locking feature is provided here by a lock bar or slide 30. The lock bar has a pin 31 that projects through a housing slot 32 that is shown in FIG. 3. The bar itself extends through a slot in the bottom of the housing and thus may be manually moved between its upper locked position shown in the drawing and a lower, unlocked position. The lock bar is mounted for reciprocal, vertical movement beside the inboard cam 24 into and out of a slot in the bottom of the outboard cam 26. In its up, locked position shown in the drawing, the lock bar, being partially positioned in the outboard cam slot, blocks the outboard cam from rotating. This renders the outside handle 21 useless in unlatching the latch until the lock bar 30 is manually pulled down from the inside. This can only be done of course if someone has access to it from the inside as the latch is mounted to the inside of a sliding door by a bracket 39 shown in FIG. 2.

The latch is further provided with an anti-lock-out device in the form of a lock cancelling plate 35. The plate 35 is mounted to the center pin 14 for very limited rotary motion about it within a shallow recess in the back of the housing defined by a recess wall 36. The plate 35 has an inverted V-shaped channel 37 in its bottom. With the lock bar 30 in its raised, locked position shown in FIG. 3, its lock pin 31 engages the throat of the V-shaped channel of the plate 35. Should the latch bar 12 however rotate, which occurs when it becomes latched to a strike, one of the ramps that define the channel 37 of the cancellation plate 35 will cam the lock slide pin 31 down. This moves the lock slide 30 down and out of engagement with the outboard cam 26. With the lock slide disengaged from the outboard cam, the cam is free to be rotated by the outside handle 21 in unlatching the latch by lifting one side of the latch bar 12. Later, the lock slide may be again raised in locking the latch. Thus, anytime the latch bar engages a strike, latching the door in its fully opened or fully closed position, the lock bar is by that action alone disengaged from its locked position should it be in that position. In this manner it provides the latch with an anti-lockout feature.

With reference next to FIGS. 4-9 of the drawings, there is shown a latch assembly 40 for a vehicle sliding door embodying principles of the invention in a preferred form. The latch assembly 40 is mounted to the sliding door of the vehicle while the unshown lock strikes are mounted to the stationary door jamb portion or doorway of the vehicle. The latch assembly 40 is essentially the same as that previously described in FIGS. 1-3 except for the design and construction of the outside handle 21 and the new, additional components coupled to the outside handle 21 for mounting and actuation purposes which may be referenced herein as an extender assembly.

Here, the housing 10 is coupled to or positioned against a rear support bracket 42, which in turn is mounted to the sliding door. The support bracket 42 includes mounting holes 44 which are aligned with mounting holes 11 extending through housing 10. Mounting bolts pass through mounting holes 44 and mounting holes 11 to secure the latch assembly 40 to the sliding door.

A U-shaped bracket or brace 46 is mounted to the support bracket 42 through mounting bolts 48 extending through support bracket mounting holes 55 and threaded into aligned brace mounting holes 50. The U-shaped brace 46 includes a clearance hole 56 in which is mounted a bushing or bearing 58.

An elevated, interior or inside handle 62 is coupled to the brace 46 for reciprocal, pivotal movement and operation of the latch assembly 40. The elevated handle 62 has a handle or grip portion 64 and a cylindrical mounting barrel or fitting 66 extending from the handle portion 64 and into the bearing 58. A wave washer 68 may be positioned between the elevated handle 62 and the bearing 58. The elevated handle 62 also has two spaced apart mounting arms or flanges 70, each mounting arm 70 having a link pin hole 72 therethrough configured to receive a first link pin 73.

A vertically oriented, elongated offset link 74 of a handle linkage 76 is coupled to the first link pin 73 by positioning the first link pin 73 through a pin mounting hole 77 in a top end of the offset link 74. Thus, the offset link 74 is pivotally coupled to the elevated handle 62.

The bottom end of the offset link 74 is pivotally coupled to a lower link 78 of the handle linkage 76 through a second link pin 80 extending through pin mounting hole 82 in the bottom end of the offset link 74 and through a pin mounting hole 84 in one end of the lower link 78. The lower link 78 is mounted to the shaft 22 of the latch assembly 40 through a mounting barrel or fitting 88 having a shaft hole 90 that is configured to receive and hold the exposed end of the shaft 22. A bolt 92 may be used to secure the lower link 78 to the shaft 22.

The combination of the elevated handle 62, the lower link 78, offset link 74, U-shaped bracket 46 and support bracket 42 may be considered to be an extender assembly as it extends the position of the elevated handle 62.

In use, the counterclockwise pivotal or rotational movement of the elevated handle 62 causes the handle mounting arms 70 to vertically rise, thereby causing the offset link 74 also to vertically rise. The raising of the offset link 74 causes the lower link 78 to pivot or rotate counterclockwise, with respect to the drawings, thereby causing pivoting or rotation of the handle shaft 22. The rotation of the handle shaft 22 causes the latch assembly 40 to open and release the door in the conventional manner previously described.

Similarly, the clockwise pivotal or rotational movement of the elevated handle 62 causes the handle mounting arms 70 to vertically lower, thereby causing the offset link 74 also to vertically lower. The lowering of the offset link 74 causes the lower link 78 to pivot or rotate clockwise, with respect to the drawings, thereby causing pivoting or rotation of the handle shaft 22. The rotation of the handle shaft 22 causes the latch assembly 40 to open and release the door in the conventional manner previously described.

Thus, the new handle mounting components comprising the support bracket 42, brace 46, elevated handle 62, offset link 74 and lower link 78 repositions the elevated handle 62 to a new, elevated position compared to its conventional position. The amount of variation may change depending on the length of the offset link 74 and adjustment of the U-shaped brace 46.

It should be understood that the latch assembly 40 may include a cover positioned over the handle linkage 76 for aesthetic purposes.

It thus is seen that the elevated, inside handle may be positioned to a different vertical position which now overcomes problems associated with latches mounted to vehicle sliding doors of the prior art. While this invention has been described in detail with particular reference to the preferred embodiment thereof, it should be understood that many modifications, additions and deletions, may be made thereto without departure from the spirit and scope of the invention as set forth in the following claims.

The invention claimed is:

1. A vehicle latch assembly for a sliding door comprising:

a support bracket mounted to the sliding door;

a U-shaped bracket separate from said support bracket and coupled to said support bracket, said U-shaped bracket having two oppositely disposed end portions and a middle portion spanning said end portions, said end portions being mounted directly to said support bracket, said middle portion having a handle hole extending therethorough;

a latch separate from both sai ppor t bracket and said U-shaped bracket, said latch having a latch housing, a movable latch bar coupled to said latch housing with at least one end having a catch, and a rotatable handle shaft coupled to said latch housing for movement of said catch, said latch being positioned between said support bracket and said U-shaped bracket, and said latch housing being coupled to said support bracket;

said support bracket structurally supports the latch when mounted to the sliding door;

a first link having a shaft end coupled to an interior end of said handle shaft, said first link also having a link end distal said interior end;

a second link having a lower end pivotally coupled to said link end of said first link, said second link having an upper end distal said lower end, and and an interior handle pivotally coupled to said U-shaped bracket through handle fitting extending through said handle hole of said U-shaped bracket for pivotal movement therebetween, said interior handle also being pivotally coupled to said upper end of said second link, whereby pivotal movement of the interior handle causes movement of the second link which in turn causes pivotal movement of the first link to rotate the handle shaft resulting in a lifting motion of the latch bar to unlatch the latch assembly.

2. The vehicle latch assembly of claim 1 further comprising an exterior handle coupled to said handle shaft.

3. A vehicle latch assembly for a sliding door comprising:

a support bracket mounted to the sliding door;

a U-shaped bracket separate from said support bracket, said U-shaped bracket being coupled to said support bracket, said U-shaped bracket having two oppositely disposed end portions and a middle portion spanning said end portions, said end portions being mounted directly to said support bracket said middle portioning a hand extending therethrough;

a latch separate from both sald support bracket and said U-shaped bracket, said latch having a latch housing positioned between said support bracket and said U-shaped bracket and coupled to said support bracket, a movable latch bar coupled to said latch housing with at least one end having a catch, and a rotatable handle shaft coupled to said latch housing for movement of said catch, said support bracket structurally supports the latch when mounted to the sliding door, and an extender assembly coupled to said latch, said extender assembly including a first link coupled to said handle shaft, a second link pivotally coupled to said first link distally from said handle shaft, and a first handle pivotally coupled to said U-shaped bracket through a handle fitting extending through aid handle hole of said U-shaped bracket for pivotal movement therebetween and pivotally coupled to said second link distally from said first link.

4. The vehicle latch assembly of claim 3 further comprising a second handle coupled to said handle shaft.

* * * * *